US010071355B2

(12) United States Patent
Olofsson et al.

(10) Patent No.: US 10,071,355 B2
(45) Date of Patent: Sep. 11, 2018

(54) CUTTING INSERTS AND METHOD FOR MAKING SAME

(71) Applicants: Element Six Abrasives S.A., Luxembourg (LU); Element Six Limited, Co. Clare (IE)

(72) Inventors: Bo Christer Olofsson, Robertsfors (SE); Cornelis Roelof Jonker, Springs (ZA); Roger William Nigel Nilen, Oxfordshire (GB); Stig Ake Andersin, Robertsfors (SE); John James Barry, Co. Clare (IE)

(73) Assignees: Element Six Abrasives S.A., Luxembourg (LU); Element Six Limited (IE)

( * ) Notice: Subject to any disclaimer, the term of this patent is extended or adjusted under 35 U.S.C. 154(b) by 724 days.

(21) Appl. No.: 14/409,750

(22) PCT Filed: Jun. 18, 2013

(86) PCT No.: PCT/EP2013/062663
§ 371 (c)(1),
(2) Date: Dec. 19, 2014

(87) PCT Pub. No.: WO2014/005834
PCT Pub. Date: Jan. 9, 2014

(65) Prior Publication Data
US 2015/0151362 A1    Jun. 4, 2015

Related U.S. Application Data

(60) Provisional application No. 61/662,231, filed on Jun. 20, 2012.

(30) Foreign Application Priority Data

Jun. 20, 2012 (GB) .................................. 1210876.7

(51) Int. Cl.
*B01J 3/06* (2006.01)
*B24D 18/00* (2006.01)
*B22F 3/00* (2006.01)
*B22F 3/12* (2006.01)
*B22F 3/14* (2006.01)
(Continued)

(52) U.S. Cl.
CPC ................. *B01J 3/06* (2013.01); *B22F 3/003* (2013.01); *B22F 3/12* (2013.01); *B22F 3/1208* (2013.01); *B22F 3/14* (2013.01); *B22F 7/06* (2013.01); *B24D 18/00* (2013.01); *C22C 26/00* (2013.01); *E21B 10/5673* (2013.01); *E21B 10/5735* (2013.01); *B22F 2003/247* (2013.01); *B22F 2005/001* (2013.01); *B22F 2999/00* (2013.01);
(Continued)

(58) Field of Classification Search
CPC .. B01J 3/06; E21B 10/00; E21B 10/46; E21B 10/54; E21B 10/55; E21B 10/56; E21B 10/567; E21B 2010/566; B24D 3/00; B24D 18/00; B23B 226/31; B23B 226/315; B23B 27/00; B23B 27/14; B23B 27/20; C23C 16/00; C23C 16/27; B22F 3/00; B22F 3/006; B22F 3/10; B22F 3/12; B22F 3/1208; B22F 3/1225; B22F 3/1233; B22F 3/14; B22F 2005/001; B22F 2005/002; C04B 35/00; C22C 26/00
See application file for complete search history.

(56) References Cited

U.S. PATENT DOCUMENTS 5,037,451 A * 8/1991 Burnand ............. E21B 10/5735
51/293
5,453,105 A    9/1995 Middlemiss et al.
(Continued)

FOREIGN PATENT DOCUMENTS

EP    0357380 A2    3/1990
GB    1000702 A * 8/1965 .............. B01J 3/062
(Continued)

OTHER PUBLICATIONS

International Search Report for PCT/EP2013/062663 dated Sep. 27, 2013.
(Continued)

*Primary Examiner* — Jennifer A Smith
*Assistant Examiner* — Alexandra Marie Moore
(74) *Attorney, Agent, or Firm* — Bryan Cave Leighton Paisner LLP

(57) ABSTRACT

A method of making a cutter structure (1) comprises placing a pre-formed body (4) of hard material having a surface topography in a canister, placing an aggregated mass of grains of superhard material (2) over said surface topography, placing a punch (10) in contact with the superhard material (2), the punch (10) having a surface with a surface topography inverse to that of the hard material body to imprint a pattern in the superhard material (2) complementary to the surface topography of the punch (10). The surface of the punch (10) contacting the superhard material (2) being formed of a ceramic material that does not react chemically with the superhard material (12) and/or a sinter catalyst for the superhard material (2). A pressure of greater than 3 GPa is then together with a temperature sufficiently high for the catalyst to melt to form the cutter structure (1) with a layer of polycrystalline superhard material bonded to the hard material and having a surface topography corresponding to the surface topography of the hard material.

22 Claims, 1 Drawing Sheet

(51) Int. Cl.
- *B22F 7/06* (2006.01)
- *C22C 26/00* (2006.01)
- *E21B 10/567* (2006.01)
- *E21B 10/573* (2006.01)
- *B24D 3/00* (2006.01)
- *E21B 10/54* (2006.01)
- *B22F 3/24* (2006.01)
- *B22F 5/00* (2006.01)
- *E21B 10/56* (2006.01)

(52) U.S. Cl.
CPC .............. *B24D 3/00* (2013.01); *E21B 10/54* (2013.01); *E21B 2010/566* (2013.01)

(56) References Cited

U.S. PATENT DOCUMENTS

| | | | |
|---|---|---|---|
| 6,106,585 A * | 8/2000 | Packer | B22F 5/003 |
| | | | 264/430 |
| 6,179,886 B1 | 1/2001 | Gordeev et al. | |
| 6,447,852 B1 | 9/2002 | Gordeev et al. | |
| 6,709,747 B1 * | 3/2004 | Gordeev | C04B 35/52 |
| | | | 428/325 |
| 6,719,074 B2 | 4/2004 | Tsuda et al. | |
| 6,919,040 B2 | 7/2005 | Fries et al. | |
| 7,008,672 B2 | 3/2006 | Gordeev et al. | |
| 2003/0051924 A1 | 3/2003 | Tsuda et al. | |
| 2010/0307829 A1 | 12/2010 | Patel | |
| 2011/0031033 A1 * | 2/2011 | Mourik | C22C 26/00 |
| | | | 175/428 |
| 2011/0259642 A1 | 10/2011 | DiGiovanni et al. | |

FOREIGN PATENT DOCUMENTS

| | | |
|---|---|---|
| GB | 2275690 A | 9/1994 |
| JP | 2004-511617 A | 4/2004 |
| WO | 2009/013713 A2 | 1/2009 |

OTHER PUBLICATIONS

Search Report for GB1210876.7 dated Oct. 22, 2012.
Search Report for GB1310865.9 dated Aug. 9, 2013.
International Standard ISO 1832-2004 Indexable inserts for cutting tools—Designation, Jun. 15, 2004, Fourth edition.

* cited by examiner

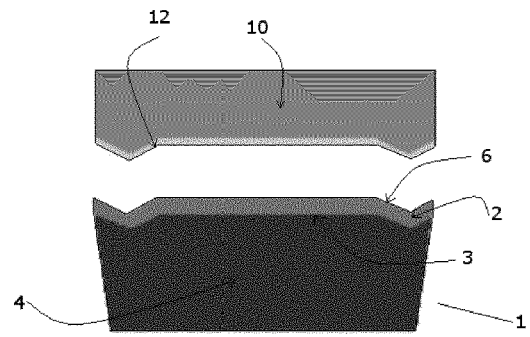
Figure 1
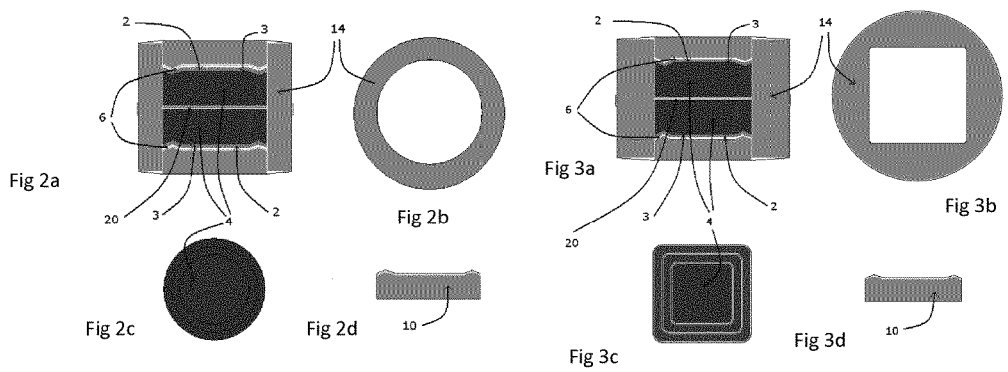
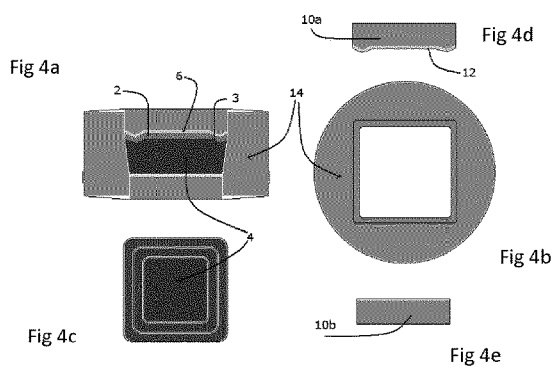

CUTTING INSERTS AND METHOD FOR MAKING SAME

FIELD

This disclosure relates generally to super-hard inserts that may be used, for example, as cutters for drilling in the oil and gas industry or as inserts for machine tools, and to a method for making the same.

BACKGROUND

It has been appreciated that cutters and machine tool cutting inserts having cutting surfaces with shaped topographies may be advantageous in various applications as the surface features may be beneficial in use to divert, for example, chips from the working surface being worked on by the cutter or machine tool, and/or in some instances to act as a chip breaker. Also, such surface topographies may produce demonstrably better surface finish qualities compared to flat surface cutting tool geometries. However, the extreme hardness and abrasion resistance of materials such as PCD or PCBN which are typically used as the cutting element or insert in such applications makes it very difficult and expensive to machine these materials with desired surface topography features that may be used, for example, as chip breakers or to divert the debris generated in use.

U.S. Pat. No. 6,106,585 discloses a method for making a cutting element, including forming a composite mass by placing a mass of abrasive crystals, either diamond or CBN, and a mass of catalyst metal in contact with the abrasive crystals into a cell or can which is a protective shield metal enclosure, in which the top surface of the inside of the can is pre-formed with dimples. This dimpled surface provides a pattern for forming features on the top surface of the layer, which function as chip breaker features.

There is a need to provide super-hard inserts such as inserts for cutting or machine tools having effective performance and to provide a more efficient method for making such inserts.

SUMMARY

Viewed from a first aspect there is provided a method of making a cutter structure comprising the steps of:
 placing a pre-formed body of hard material having a surface topography in a canister;
 placing an aggregated mass of grains of superhard material into the canister over the surface of the body of hard material having the surface topography,
 placing a punch in contact with the aggregated mass of grains of superhard material, the punch having a surface with a surface topography inverse to the surface topography of the hard material body, the surface topography of the punch imprinting a pattern in the aggregated mass of grains of superhard material complementary to the surface topography of the punch and corresponding to the surface topography of the body of hard material, the surface of the punch in contact with the aggregated mass of grains of superhard material being formed of a ceramic material that does not react chemically with the superhard material and/or a sinter catalyst material for the grains of superhard material, the method further comprising:
 subjecting the aggregated mass of grains of superhard material, the punch and the body of hard material to a pressure of greater than around 3 GPa in the presence of the sinter catalyst material for the grains of superhard material at a temperature sufficiently high for the catalyst material to melt,
 sintering the grains to form the cutter structure comprising a layer of polycrystalline superhard material bonded to the body of hard material and having a surface topography corresponding to the surface topography of the hard material body and complementary to the surface topography of the punch;
 removing the cutter structure from the canister; and
 removing the punch from the layer of polycrystalline superhard material.

Viewed from a further aspect there is provided an insert for a machine tool comprising a cutter structure formed according to the above method.

Viewed from a third aspect there is provided a cutter for boring into the earth comprising a cutter structure formed according to the above method.

Viewed from further aspect there is provided a PCD element for a rotary shear bit for boring into the earth, for a percussion drill bit or for a pick for mining or asphalt degradation, comprising cutter structure formed according to the above method.

Viewed from a yet further aspect there is provided a drill bit or a component of a drill bit for boring into the earth, comprising cutter structure formed according to the above method.

In embodiments where the insert is used as a cutter, for example for drilling in the oil and gas industry, the surface topography may be used to direct or divert the rock or earth away from the drill bit to which the cutter is attached. Alternatively or additionally, for such uses or when used as an insert for a machine tool for machining a workpiece, the surface topography may act as a chip breaker suitable for controlling aspects of the size and shape of chips formed in use. Such topography may include depression and/or protrusion features, such as radial or peripheral ridges and troughs, formed on a rake surface of the insert.

Various example arrangements and combinations for cutter structures and inserts are envisaged by the disclosure. The cutter structure may comprise natural or synthetic diamond material, or cBN material. Examples of diamond material include polycrystalline diamond (PCD) material, thermally stable PCD material, crystalline diamond material, diamond material made by means of a chemical vapour deposition (CVD) method or silicon carbide bonded diamond. An example of cBN material is polycrystalline cubic boron nitride (PCBN).

Disclosed example methods may be relatively less complex and/or more cost efficient, and disclosed example inserts and cutter structures may have enhanced machining or cutting performance.

BRIEF DESCRIPTION OF THE DRAWINGS

Embodiments are now described with reference to the accompanying drawings in which:

FIG. 1 is a schematic cross-section through a first cutter structure having a shaped interface between a layer of superhard material and a substrate attached thereto, with the punch shown above the cutter structure;

FIG. 2a is a schematic cross-section through a canister and two cutter structures according to an embodiment;

FIG. 2b is a schematic plan view of the canister of FIG. 2a;

FIG. 2c is a schematic plan view of one of the cutter structures of FIGS. 1 and 2a;

FIG. 2d is a schematic cross-section through the punch which is shown in FIG. 2a as being located in the canister;

FIG. 3a is a schematic cross-section through a canister and two cutter structures according to a further embodiment;

FIG. 3b is a schematic plan view of the canister of FIG. 3a;

FIG. 3c is a schematic plan view of one of the cutter structures of FIG. 3a; and FIG. 3d is a schematic cross-section through the punch shown in FIG. 3a as located in the canister.

FIG. 4a is a schematic cross-section through a canister and a cutter structure according to a further embodiment;

FIG. 4b is a schematic plan view of the canister of FIG. 4a;

FIG. 4c is a schematic plan view of one of the cutter structures of FIG. 4a;

FIG. 4d is a schematic cross-section through the punch shown in FIG. 4a as located in the canister; and FIG. 4e is a schematic cross-section through the end support punch shown in FIG. 4a as located in the canister.

The same reference numerals have been used throughout the drawings to refer to common features.

DETAILED DESCRIPTION

Certain terms and concepts as used herein will now be briefly explained.

As used herein, "superhard" or ultra-hard material has Vickers hardness of at least about 25 GPa. Synthetic and natural diamond, polycrystalline diamond (PCD), cubic boron nitride (cBN) and polycrystalline cBN (PCBN) material are examples of superhard materials. Synthetic diamond, which is also called man-made diamond, is diamond material that has been manufactured. A PCD structure comprises or consists of PCD material and a PCBN structure comprises or consists of PCBN material. Other examples of superhard materials include certain composite materials comprising diamond or cBN grains held together by a matrix comprising ceramic material, such as silicon carbide (SiC), or by cemented carbide material such as Co-bonded WC material (for example, as described in U.S. Pat. Nos. 5,453,105 or 6,919,040). For example, certain SiC-bonded diamond materials may comprise at least about 30 volume percent diamond grains dispersed in a SiC matrix (which may contain a minor amount of Si in a form other than SiC). Examples of SiC-bonded diamond materials are described in U.S. Pat. Nos. 7,008,672; 6,709,747; 6,179,886; 6,447,852; and International Application publication number WO2009/013713).

As used herein, polycrystalline diamond (PCD) material comprises a mass (an aggregation of a plurality) of diamond grains, a substantial portion of which are directly inter-bonded with each other and in which the content of diamond is at least about 80 volume percent of the material. Interstices between the diamond grains may be at least partly filled with a binder material comprising a catalyst material for synthetic diamond, or they may be substantially empty. Catalyst material for synthetic diamond is capable of promoting the growth of synthetic diamond grains and or the direct inter-growth of synthetic or natural diamond grains at a temperature and pressure at which synthetic or natural diamond is thermodynamically more stable than graphite. Examples of catalyst materials for diamond are Fe, Ni, Co and Mn, and certain alloys including these. Bodies comprising PCD material may comprise at least a region from which catalyst material has been removed from the interstices, leaving interstitial voids between the diamond grains.

PCBN material comprises grains of cubic boron nitride (cBN) dispersed within a matrix comprising metal or ceramic material. For example, PCBN material may comprise at least about 35 volume percent or at least about 50 volume percent cBN grains dispersed in a matrix material comprising a Ti-containing compound, such as titanium carbide, titanium nitride, titanium carbonitride and/or an Al-containing compound, such as aluminium nitride, and/or compounds containing metal such as Co and/or W. Some versions (or "grades") of PCBN material may comprise at least about 80 volume percent or even at least about 90 volume percent cBN grains.

Thermally stable PCD material comprises at least a part or volume of which exhibits no substantial structural degradation or deterioration of hardness or abrasion resistance after exposure to a temperature above about 400 degrees centigrade, or even above about 700 degrees centigrade. For example, PCD material containing less than about 2 weight percent of catalyst metal for diamond such as Co, Fe, Ni, Mn in catalytically active form (e.g. in elemental form) may be thermally stable. PCD material that is substantially free of catalyst material in catalytically active form is an example of thermally stable PCD. PCD material in which the interstices are substantially voids or at least partly filled with ceramic material such as SiC or salt material such as carbonate compounds may be thermally stable, for example. PCD structures having at least a significant region from which catalyst material for diamond has been depleted, or in which catalyst material is in a form that is relatively less active as a catalyst, may be described as thermally stable PCD.

As explained above, PCD material and PCBN material may be provided by sintering a plurality of diamond or cBN grains respectively in the presence of a suitable binder or catalyst material onto a substrate, such as a cemented carbide substrate. The PCD or PCBN structure thus produced is likely to be formed joined to the substrate, being an integral part of a construction comprising the PCD or PCBN structure bonded to the substrate during the process in which the respective structure formed into a sintered body.

A machine tool is a powered mechanical device, which may be used to manufacture components comprising materials such as metal, composite materials, wood or polymers by machining, which is the selective removal of material from a body, called a workpiece. A rake face of a cutter insert is the surface or surfaces over which the chips flow when the tool is used to remove material from a body, the rake face directing the flow of newly formed chips. Chips are the pieces of a body removed from the work surface of the body by a machine tool in use. Controlling chip formation and directing chip flow are important aspects of tools for high productivity machining and or high surface finish machining of advanced alloys of aluminium, titanium and Nickel. The geometry of chip-breaker features may be selected according to various machining factors, such as the work piece material, cutting speed, cutting operation and surface finish required.

FIGS. 1, 2a, 2c, 3a, 3c, 4a, and 4c show cutter structures which may, in use, be attached to a machine tool (not shown) for machine tooling applications. The cutter structures 1 comprise a thin superhard layer 2 formed, for example of PCD or PCBN, bonded along an interface 3 to a substrate 4, such as a tungsten carbide substrate. The interface 3 between the substrate 4 and the thin superhard layer 2 has a shaped surface topography. The thin superhard layer 2 bonded or to be bonded to the substrate 4 follows the contours of the interface 3 therebetween and has a surface topography on its free surface 6 which matches the surface topography of the substrate 4 at the interface 3, the free surface 6 being the opposing surface to that forming the interface 3 with the substrate 4.

To achieve the matching surface topography on the free surface 6 of the thin superhard layer 2, a punch 10 as shown in FIGS. 1, 2a, 2d, 3a and 3d is pressed into/on the free surface of the superhard layer 2, the punch 10 having a surface topography 12 that corresponds to that of the free surface 6 of the superhard layer 2 and the interface 3 between the substrate 4 and the superhard layer 2.

In the embodiments shown in FIGS. 2a to 2d, the cutter structure 1 is substantially cylindrical. The cutter structure shown in FIGS. 3a to 3d differs from that shown in FIGS. 2a to 2d only in that the cross-sectional shape of the cutter structure in FIGS. 3a to 3d is substantially square, rather than round as in the cutter structure of FIGS. 2a to 2d. The cutter structure shown in FIGS. 4a to 4e differs from that shown in FIGS. 2a to 2d and 3a to 3d only in that the cross-sectional shape of the cutter structure in FIGS. 4a to 4e is conical, rather than rectangular as in the cutter structure of FIGS. 2a to 3d. However these are only examples. Other cutter structures for use as precision machining structures are also possible, for example those illustrated in ISO 1832-2004.

In a first embodiment, such as that shown in FIGS. 1 to 4e, a cutter structure 1 may be formed by the following method. An aggregated mass of grains of superhard material 2 is placed into a canister 14, on top of a pre-formed cemented carbide substrate 4. The aggregated mass of diamond grains 2 may be in the form of, for example, thin micron diamond paper or a layer of loose diamond grains. The punch 10 may, for example, be formed of a ceramic material which does not react chemically with the superhard material 2 or may be formed of an alternative material, such as a rigid metal, for example molybdenum or cemented tungsten carbide, with a coating of such ceramic material applied, for example by PVD techniques, to the shaped surface of the punch 10 which is to contact the superhard layer 2 during formation of the insert 1. The shaped surface of the punch 10 is placed in contact with the aggregated mass of grains of superhard material 2. The ceramic material may additionally or alternatively be such that it does not react chemically with the sinter catalyst material used to bond the grains of the superhard material to one another during sintering.

In some embodiments, the surface topography of the punch is placed in direct contact with the grains of superhard material to imprint a pattern therein complementary to the surface topography. In such embodiments, the punch is formed of the abovementioned type of ceramic material. In other embodiments where the punch is formed of an alternative material such as cemented tungsten carbide, a ceramic coating or layer is applied to the surface topography of the punch to assist in post sintering separation of the ceramic material from the sintered superhard material. In these embodiments, the coating or additional layer is also formed of a material that does not react chemically with the superhard material and/or the sinter catalyst material.

In some embodiments, the canister 14 may also be formed of a ceramic material such as, for example, alumina, or zirconia which does not react chemically with the superhard material 2 or another refractory metal such as niobium.

The aggregated mass of grains of superhard material 2, substrate 4 and punch 10 are then subjected to a pressure of greater than around 3 GPa, depending on the nature of the superhard material, in the presence of a sinter catalyst material for the grains of superhard material, at a temperature sufficiently high for the catalyst material to melt. The grains are then sintered to form a body of polycrystalline superhard material bonded to the substrate 4, the body of superhard material having a surface topography complementary to the surface topography of the punch 10. The punch 10 is then removed from the polycrystalline superhard material for example by impact. It may also be required to improve the surface texture by brush-honing.

The punch may easily be removed from the sintered cutter structure as there is no chemical reaction with the ceramic material of which the punch is formed or coated enabling easy separation of the two bodies. Any residual ceramic may be removed by a light sand blast, resulting in a good, semi-polished surface finish. The ceramic materials that may be used to create the surface topography in the superhard material may include, for example, the group of oxide ceramic materials that are not reduced by carbo-thermal reaction, including Magnesia, Calcia, Zirconia, Alumina.

Pressures of around 3 GPa to above 7 GPa may, for example, be used to sinter the polycrystalline superhard material and sintering may take place at a temperature of, for example, between around 1300 to around 1800 degrees C.

As mentioned above, in some embodiments, the surface topography of the ceramic material may be coated with a layer which directly contacts the grains prior to sintering and which is of a composition such that it facilitates removal of the ceramic body from the sintered body of polycrystalline superhard material. Examples of such a coating may include zirconia, alumina, calcium carbonate or calcium oxide.

In alternative embodiments, the ceramic material directly contacts the grains of polycrystalline superhard material to be sintered.

Examples of superhard material may include grains of diamond material, such as an aggregated mass of natural or synthetic diamond grains or, for example, an aggregated mass of cubic boron nitride grains. The step of placing the grains of superhard material 2 into the canister 14 may, in some embodiments, comprise providing one or a plurality of sheets comprising the grains and placing or stacking the sheets in the canister 14 to form the aggregation of superhard grains 2. In other embodiments, the grains of superhard material 2 may be deposited into the canister 14 using sedimentation or electrophoretic deposition techniques.

In some embodiments, the ceramic material may be formed, for example, of any one or more of the group of oxide ceramic materials that are not reduced by carbothermal reaction in contact with the grains. An example of such materials may include any one or more of the group of oxide ceramic materials comprising oxides of magnesia, calcia, zirconia, and/or alumina.

The steps of placing the materials in the canister 14 may be reversed or their order changed, for example, the step of placing the punch 10 in contact with the aggregated mass of grains 2 may be after the step of placing the grains into a canister 14. Alternatively, the punch 10 may be placed into the canister 14 before the grains 2 and the pre-formed substrate 4 are placed in the canister 14.

In the embodiments shown in FIGS. 2a to 2d and 3a to 3d, two cutter structures 1 are formed simultaneously in a single canister 14. In such embodiments, the pre-formed substrates 4 are placed back-to-back with a separator 20 between the two substrates 4, profiled surfaces facing outwards. The superhard material layer 2 is then placed in the canister 14 for one cutter structure adjacent the interface 3 of one of the substrates 4. A first punch 10 is then pressed into the canister 14 to imprint a corresponding surface topography into the superhard layer 2 of the first cutter structure 1. The second superhard layer is then placed adjacent the interface of the second substrate in the canister 14 and a second punch 10 is pressed into the second superhard layer. The canister 14 and contents are then subjected to the elevated pressures and temperatures described above to sinter the cutter structures 1.

The body of polycrystalline superhard material formed by this method may have a free outer surface, on removal of the ceramic layer therefrom, which is of the same quality as the bulk of the body of polycrystalline material. This is in contrast, for example, to conventionally formed PCD in which the PCD layer in direct contact with the canister material used during sintering is usually of an inferior quality compared to the bulk PCD due to an interaction between the diamond, cobalt binder and canister material. Thus, in conventional PCD cutters, it is usually necessary to remove the top surface by grinding, sandblasting or other methods. Such steps are not required in PCD formed according to one or more embodiments as the body of polycrystalline superhard material has a surface topography on a first surface, the first surface being substantially free of material from a canister used in formation of the cutter structure 1. A further benefit of avoiding the conventional processing methods such as lapping and grinding is the ability to reduce or eliminate residual defects in the sub-surface which improves the materials resistance to chipping in application.

The surface topography of the ceramic material may be designed according to the requirements of a given application of the cutter structure 1 and having regard to the intended shape of the cutter structure 1 depending on its ultimate use.

In some embodiments, one or more pinlock holes (not shown) may be formed through the superhard layer 2 and substrate 4 prior to sintering and, filled with a plug prior to and during sintering. The plug for the pinhole may be formed of, for example, a ceramic such as alumina or zirconia that does not react chemically with the superhard material 2. After sintering, the plug may be punched out of the pinlock hole enabling the hole to be used for securing the insert to a machine tool in use.

In some embodiments, the thickness of the layer 2 of superhard material may be, for example, in the range of around 50 to 600 microns, or 50 to 500 microns, or 100 to 200 microns, or 50 to 300 microns. For precision machining applications, thinner layers than conventionally used with PCD or PCBN materials may be used, for example less than around 200 microns, as this may reduce the cost of peripheral grinding or erosion.

In some embodiments in which the punch 10 is coated with a ceramic material, the thickness of the coating may be for example in the range of around 3 to 50 microns, or around 3 to 10 microns.

Cutter structures 1 formed according to the above-described methods may have many applications. For example, they may be used as inserts for a machine tool, in which the insert comprises the cutter structure 1 according to one or more embodiments and the surface topography of the substrate and superhard material bonded thereto may be used as a chip-breaker in such applications. In such inserts, the cutter structure which may be joined to an insert base, may have, for example, a mean thickness of, for example, at least around 100 microns, and in some embodiments, a mean thickness of at most 1,000 microns.

In other embodiments, the cutter structures 1 formed according to the above-described method may be used as a cutter for boring into the earth, or as a PCD element for a rotary shear bit for boring into the earth, or for a percussion drill bit or for a pick for mining or asphalt degradation. Alternatively, a drill bit or a component of a drill bit for boring into the earth, may comprise the cutter structure 1 according to any one or more embodiments.

The surface topography of the substrate 4 may be created in forming the substrate and the method may include forming the features onto a surface of a green body comprising pre-cursor material for the substrate body and sintering the green body to form the substrate body. Alternatively, the surface topography of the substrate material 4 may be generated after formation of the substrate 4, for example, using a machining technique such as laser machining, or by means of a machine tool or by etching, depending to a certain extent on the type of material comprised in the substrate body 4.

Non-limiting examples are described in more detail below to illustrate the method.

EXAMPLE 1

A surface topography configuration may be designed according to the requirements of a given drilling or machining application and having regard to the intended shape of a cutter structure or machine tool insert. A cobalt-cemented carbide substrate body 4 and a ceramic punch 10 are provided, the ceramic punch 10 having a surface comprising a surface topography that is complementary (i.e. inverse) to that of the desired surface topography for the cutter or machine tool insert 1. A pre-compact assembly may be prepared by forming a plurality of diamond grains into an aggregation against the contoured surface 3 of the substrate 4, and encapsulating the assembly within a jacket or canister 14, formed, for example, of alumina or other ceramic material. The surface of the ceramic punch 10 having the desired surface topography to be imparted to the cutter structure 1 on sintering is placed in contact with the diamond grains 2, as shown in FIG. 1. The diamond grains 2 may have a mean size of, for example, at least about 1 micron and at most about 20 microns and the aggregation may be sufficiently thick (i.e. comprise a sufficiently large number of diamond grains) for a PCD layer having a thickness of about 50 to 600 microns to be produced, and in some cases at least 1 mm, depending on the intended application of the cutter structure. The pre-compact assembly may be subjected to an ultra-high pressure of at least about 5.5 GPa and a temperature of at least about 1,250 degrees centigrade to melt the cobalt comprised in the substrate body and sinter the diamond grains to each other to form a cutter structure 1 comprising a PCD layer 2 joined to the substrate 4. The ceramic punch 10 may be removed from the sintered PCD material by, for example, light impact. In the event that the cutter structure is to be used, for example as a cutter for a drill bit, it may be advantageous to treat the PCD layer 2 after sintering, for example in acid, to remove residual cobalt within the interstitial regions between the inter-grown diamond grains. Removal of a substantial amount of cobalt from the PCD structure is likely to increase substantially the thermal stability of the PCD structure and will likely reduce the risk of degradation of the PCD material in use in such applications.

The cutter structure 1 may be further processed, depending on its intended application. For example, if it is to be used as a machine tool insert, it may be further treated by grinding to provide a machine tool insert comprising the PCD cutter structure having well-defined chip-breaker features.

EXAMPLE 2

A surface topography configuration may be designed according to the requirements of a given machining application and having regard to the intended shape of a machine tool insert. A ceramic punch 10 may be provided, having a surface comprising a surface topography that is complementary (i.e. inverse) to that of the desired surface topography for the cutter structure 1. A pre-compact assembly may be prepared by forming a plurality of cubic boron nitride (cBN) grains 2 into an aggregation against the surface of a pre-formed substrate 4, and encapsulating the assembly within a jacket or canister 14 formed, for example, of a ceramic material such as alumina. The surface of the ceramic punch 10 having the desired surface topography to be imparted to the superhard layer 2 on sintering is placed in contact with the cubic boron nitride (cBN) grains, as shown in FIG. 1. The aggregation may also include a blend of powders comprising 86 weight % cBN grains and a binder material comprising 70.0 weight % Al, 11.7 weight % Co and 18.3 weight % W. The cBN grains may have a mean size in the range, for example, from about 12 microns to about 17 microns and the aggregation may be sufficiently thick for a PCBN layer to be formed having a thickness of around 30 to 600 microns for embodiments in which the intended use of the cutter structure is an insert for a machine tool, and at least about 1 mm or greater for embodiments in which the intended use is as another type of cutter. The pre-compact assembly may be subjected to an ultra-high pressure of at least about 3 GPa, and for example in some embodiments around 4.5 GPa, and a temperature of at least about 1,300 degrees centigrade to sinter the aggregation to form a cutter structure 1 comprising a PCBN structure 2 formed joined to the substrate 4. The ceramic punch 10 may be substantially removed by light impact and the PCBN structure may be treated by, for example, sand blasting, to remove residual ceramic material, if any. The cutter structure thus formed may be processed such as by grinding to provide, for example a machine tool insert comprising a PCBN cutter structure having well-defined chip-breaker features.

As discussed above, in both examples instead of forming the ceramic punch 10 completely of a ceramic material that does not react chemically with the superhard material in the formation of the cutter structure 1, a punch 10 formed of another hard material such as cemented tungsten carbide may be used, the surface topography of the punch which is to contact the superhard material 2 in the sintering process being coated with a ceramic material that does not react chemically with the superhard material or binder used in sintering.

The geometry of the surface topography of the formed cutter structure 1, may be selected according to the application to which the structure is to be applied and may for example depend on various machining factors, such as the work piece material, cutting speed, cutting operation and surface finish required. It may comprise, for example, ridges, protrusions, trough or other surface features or geometries arranged on the surface.

In summary, some embodiments describe a PCD/PCBN compact with engineered shapes and surface features to be used in cutting tools, drilling and other applications. The method of making such compacts by engineering the pre-composite and capsule assembly components in the high pressure systems used to make them is also described. This includes the use of ceramic nesting material, such as alumina, which becomes malleable at elevated temperatures of 1500° C., but under the high pressure conditions used to produce the compacts will still maintain its shape. The superhard material bodies so produced have surface features after recovery from the HPHT sintering cycle that will require minimal machining to achieve final tolerances for use as a cutting tool.

The invention claimed is:

1. A method of making a cutter structure comprising the steps of:
    placing a pre-formed body of hard material having a surface topography in a canister;
    placing an aggregated mass of grains of superhard material into the canister over the surface of the body of hard material having the surface topography,
    placing a punch in contact with the aggregated mass of grains of superhard material, the punch having a surface with a surface topography inverse to the surface topography of the hard material body, the surface topography of the punch imprinting a pattern in the aggregated mass of grains of superhard material complementary to the surface topography of the punch and corresponding to the surface topography of the body of hard material, the surface of the punch in contact with the aggregated mass of grains of superhard material being formed of a ceramic material that does not react chemically with the superhard material and/or a sinter catalyst material for the grains of superhard material, the method further comprising:
    subjecting the aggregated mass of grains of superhard material, the punch and the body of hard material to a pressure of greater than around 3 GPa in the presence of the sinter catalyst material for the grains of superhard material at a temperature sufficiently high for the catalyst material to melt,
    sintering the grains to form the cutter structure comprising a layer of polycrystalline superhard material bonded to the body of hard material and having a surface topography corresponding to the surface topography of the hard material body and complementary to the surface topography of the punch;
    removing the cutter structure from the canister; and
    removing the punch from the layer of polycrystalline superhard material.

2. A method according to claim 1, wherein the step of placing the punch in contact with the aggregated mass of grains is after the step of placing the grains into a canister.

3. A method according to claim 1, further comprising:
    placing a second pre-formed body of hard material having a surface topography in the canister spaced from the first pre-formed body by a layer of separating material;
    placing a second aggregated mass of grains of superhard material into the canister over the surface of the second body of hard material having the surface topography; and
    placing a second punch in contact with the second aggregated mass of grains of superhard material; wherein
    the step of sintering comprises sintering to form a first and second cutter structure within the canister.

4. A method according to claim 3, wherein the punch, superhard grains and pre-formed body of hard material for forming the first cutter structure are placed in the canister prior to the punch, superhard grains and pre-formed body of hard material for forming the second cutter structure are placed in the canister.

5. A method according to claim 1, wherein the step of subjecting the grains of superhard material to a pressure comprises subjecting the grains to a pressure of greater than: around 4 GPa, or around 5 GPa, or around 5.5 GPa, or around 6.8 GPa, or around 7 GPa.

6. A method according to claim 1, wherein the step of placing the surface of the punch in contact with the grains comprises placing a punch formed of a ceramic material comprising any one or more of the group of oxide ceramic materials that are not reduced by carbo-thermal reaction in contact with the grains of superhard material.

7. A method according to claim 6, wherein the ceramic material is formed of any one or more of the group of oxide ceramic materials comprising magnesia, calcia, zirconia, and/or alumina.

8. A method according to claim 1, wherein the step of placing the surface of the punch in contact with the grains comprises placing a punch having a surface topography coated with a ceramic material comprising any one or more of the group of oxide ceramic materials that are not reduced by carbo-thermal reaction in contact with the grains.

9. A method according to claim 8, wherein the ceramic material is formed of any one or more of the group of oxide ceramic materials comprising magnesia, calcia, zirconia, and/or alumina.

10. A method according to claim 1, wherein the step of forming the cutter structure comprises forming a polycrystalline superhard material layer having a free outer surface on removal of the punch therefrom in which the free outer surface is of the same quality as the bulk of the body of polycrystalline superhard material.

11. A method according to claim 1, wherein the step of placing an aggregated mass of grains of superhard material into a canister comprises placing an aggregated mass of natural or synthetic diamond grains into the canister.

12. A method according to claim 1, wherein the step of placing an aggregated mass of grains of superhard material into a canister comprises placing an aggregated mass of cubic boron nitride grains into the canister.

13. A method as claimed in claim 1, further comprising treating the sintered super-hard material to remove catalyst material from interstices between inter-bonded grains in the superhard material after sintering.

14. A method according to claim 1, wherein the step of placing the grains of superhard material into the canister comprises providing a plurality of sheets comprising the grains and stacking the sheets in the canister to form the aggregation of superhard grains.

15. A method according to claim 1, wherein the step of placing an aggregated mass of grains of superhard material into a canister comprises placing an aggregated mass of loose grains into the canister.

16. A method according to claim 1, wherein the step of placing the grains of superhard material into the canister comprises depositing the grains into the canister using sedimentation or electrophoretic deposition techniques.

17. A method according to claim 1 of making a cutter structure comprising an insert for a machine tool, the surface topography on the superhard layer forming a chip-breaker topography.

18. A method according to claim 1, further comprising placing one or more interlayers between the pre-formed substrate and the aggregated mass of superhard material to form a gradated cutter structure on sintering.

19. A method according to claim 18, wherein the interlayers comprise a further mass of aggregated grains of superhard material comprising diamond grains and/or PCBN grains.

20. A method according to claim 1, further comprising forming one or more pinlock holes extending through the aggregated mass of superhard grains and body of hard material prior to sintering; placing a plug into the hole(s); and removing the plug(s) after the step of sintering.

21. A method according to claim 20, wherein the plug(s) is/are formed of a ceramic that does not react chemically with the superhard material.

22. A method according to claim 21, wherein the plug(s) is/are formed of alumina or zirconia.

* * * * *